(12) United States Patent
Murata et al.

(10) Patent No.: US 8,540,940 B2
(45) Date of Patent: Sep. 24, 2013

(54) CATALYTIC CONVERTER DEVICE

(75) Inventors: Toshio Murata, Toyota (JP); Hideyuki Kohmitsu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/201,394

(22) PCT Filed: Mar. 29, 2010

(86) PCT No.: PCT/JP2010/055604
§ 371 (c)(1),
(2), (4) Date: Aug. 12, 2011

(87) PCT Pub. No.: WO2011/121710
PCT Pub. Date: Oct. 6, 2011

(65) Prior Publication Data
US 2013/0011305 A1 Jan. 10, 2013

(51) Int. Cl.
*F01N 3/10* (2006.01)
*B01D 50/00* (2006.01)

(52) U.S. Cl.
USPC .......................................... 422/174; 422/179

(58) Field of Classification Search
USPC .......................................... 422/177, 179, 180
See application file for complete search history.

(56) References Cited

U.S. PATENT DOCUMENTS

| | | | |
|---|---|---|---|
| 3,770,389 A | 11/1973 | Kitzner et al. | |
| 5,070,694 A * | 12/1991 | Whittenberger | 60/300 |
| 6,168,763 B1 | 1/2001 | Hotz et al. | |

FOREIGN PATENT DOCUMENTS

| | | |
|---|---|---|
| GB | 2425073 A * | 10/2006 |
| JP | A-48-054312 | 7/1993 |
| JP | A-05-253491 | 10/1993 |
| JP | A-09-267045 | 10/1997 |
| JP | A-10-339131 | 12/1998 |
| JP | A-2006-048672 | 2/2006 |
| JP | A-2011-153536 | 8/2011 |
| WO | WO 2009/028310 A1 | 3/2009 |

OTHER PUBLICATIONS

Decision to Grant issued in Japanese Application No. 2011-501050 dated Aug. 14, 2012 (with translation).
International Search Report issued in Application No. PCT/JP2010/055604; Dated Jun. 22, 2010 (With Translation).

* cited by examiner

*Primary Examiner* — Tom Duong
(74) *Attorney, Agent, or Firm* — Oliff & Berridge, PLC

(57) ABSTRACT

To obtain a catalytic converter device that can suppress a drop in the effect of heating a catalyst carrier caused by water droplets produced in an exhaust pipe. A holding mat that holds a catalyst carrier in a case cylinder is given a three-layer structure comprising an inside fiber layer, a solid layer, and an outside fiber layer. The solid layer projects toward an upstream side from an upstream-side end face of the catalyst carrier, and an interstice portion is configured between the projecting portion and the case cylinder. Water droplets adhering to the inner peripheral surface of the case cylinder do not reach the catalyst carrier because the projecting portion serves as a barrier.

5 Claims, 6 Drawing Sheets

CATALYTIC CONVERTER DEVICE

TECHNICAL FIELD

The present invention relates to a catalytic converter device disposed in an exhaust pipe of an internal combustion engine.

BACKGROUND ART

Among catalytic converter devices disposed in an exhaust pipe to purify exhaust gas produced by an internal combustion engine, there is, as described in patent document 1, for example, a catalytic converter device where an electric current is passed through a metallic catalyst carrier that carries a catalyst to thereby raise its temperature such that a sufficient catalytic effect is obtained.

Incidentally, in the structure described in patent document 1, the metallic catalyst carrier is fitted in a shell (case), and a mat member having a buffering function is fitted and held between a conductive member of the metallic catalyst carrier and the shell. Here, it is assumed that water produced by the combustion of the internal combustion engine scatters as condensation water on the upstream side of the metallic catalyst carrier. The mat member is configured by an electrical insulating material, but when the shell and the metallic catalyst carrier end up being short-circuited by water droplets produced by scattered condensation water, sometimes the effect of heating the catalyst carrier drops because electricity also flows to the shell.

Patent Document 1: JP-A No. 5-253491

DISCLOSURE OF THE INVENTION

Technical Problem

In view of the above-described facts, it is a problem of the present invention to obtain a catalytic converter device that can suppress a drop in the effect of heating a catalyst carrier caused by water droplets produced in an exhaust pipe.

Means for Solving the Problem

In a first aspect of the present invention, a catalytic converter device comprises: a catalyst carrier that carries a catalyst for purifying exhaust gas exhausted from an internal combustion engine and is heated by passing an electric current therethrough; a cylinder that is formed in a cylindrical shape, contains the catalyst carrier inside, and is attached to an exhaust pipe; a holding member that is equipped with an inside elastic member placed on an outer peripheral surface side of the catalyst carrier, an outside elastic member placed on an inner peripheral surface side of the cylinder, and a middle member placed between the inside elastic member and the outside elastic member, with the holding member holding the catalyst carrier in the cylinder by the elasticity of the inside elastic member and the outside elastic member and electrically insulating the catalyst carrier and the cylinder; and a projecting portion that is disposed on at least part of an upstream-side end portion of the middle member in a flow direction of the exhaust gas and is positioned on the upstream side of an upstream-side end portion of the outside elastic member.

In this catalytic converter device, when the catalyst carrier is heated by passing an electric current therethrough such that its temperature is raised, the purifying effect resulting from the carried catalyst can be more highly exhibited compared to a case where the temperature is not raised. Further, the catalyst carrier is attached to the exhaust pipe via the holding member and the cylinder, and in particular the catalyst carrier is held in the cylinder by the elastic force of the inside elastic member and the outside elastic member configuring the holding member, so relative movement between the cylinder and the catalyst carrier (displacement resulting from thermal expansion, vibration from the vehicle, etc.) can be absorbed. The holding member electrically insulates the catalyst carrier and the cylinder, so the catalyst carrier and the cylinder are not short-circuited via the holding member.

Sometimes water produced by the combustion of the internal combustion engine is included in the exhaust gas, and sometimes this water condenses such that water droplets are produced. In the present invention, the middle member is placed between the inside elastic member and the outside elastic member, and the projecting portion positioned on the upstream side of the upstream-side end portion of the outside elastic member is disposed on at least part of the upstream-side end portion of the middle member in the flow direction of the exhaust gas. For this reason, an interstice is configured between the cylinder and the projecting portion. Consequently, when water droplets collect in the interstice, the projecting portion serves as a barrier with respect to these water droplets so that the water droplets can be suppressed from reaching the catalyst carrier. That is, the water droplets do not reach the catalyst carrier, and short-circuits between the cylinder and the catalyst carrier caused by the water droplets can be suppressed. Thus, electricity reliably flows through the catalyst carrier, so a drop in the effect of heating the catalyst carrier can be suppressed.

In the present invention, the catalytic converter device may be given a configuration where the middle member has an electrical insulating property. Even in a case where water droplets adhere between the cylinder and the projecting portion and between the projecting portion and the catalyst carrier or a case where the inside elastic member and the outside elastic member have absorbed water, the electrical path from the cylinder via the inside elastic member and the outside elastic member to the catalyst carrier is blocked by the projecting portion (middle member). That is, short-circuits between the cylinder and the catalyst carrier via the projecting portion (middle member) are suppressed.

As for the electrical insulating property here, for example, in terms of the physicality of the middle member, it suffices for its volume resistivity to be equal to or greater than about $10^8$ Ω/cm at 500° C. Further, in a state where the catalytic converter device has actually been configured, it suffices for the electrical resistance between the inner peripheral surface and the outer peripheral surface of the middle member to be equal to or greater than 10 MΩ.

In the present invention, the catalytic converter device may be given a configuration further comprising an insulating layer that is placed between the catalyst carrier and the inside elastic member and electrically insulates these. Thus, the insulating property between the cylinder and the catalyst carrier can be further raised, and short-circuits between these can be suppressed.

In the present invention, if the projecting portion is disposed on at least part of the upstream-side end face of the middle member, short-circuits between the cylinder and the catalyst carrier caused by water droplets can be suppressed at the site where the projecting portion is disposed, but water droplets easily collect downward because of gravity in the exhaust pipe. Consequently, for example, by configuring the catalytic converter device such that the projecting portion is disposed on a portion including a lowermost end portion of the upstream-side end portion of the middle member, short-circuits between the cylinder and the catalyst carrier caused by water droplets can be more effectively suppressed compared to a configuration where the projecting portion is not formed in the site including this lowermost end portion.

Moreover, by configuring the catalytic converter device such that the projecting portion is formed on the entire circumference along the inner peripheral surface of the cylinder, short-circuits between the cylinder and the catalyst carrier caused by water droplets can be suppressed on the entire circumference of the cylinder.

In the present invention, the catalytic converter device may be given a configuration where the middle member is divided into a plurality in a circumferential direction of the catalyst carrier. By dividing the middle member in the circumferential direction in this way, placement and attachment of the middle member to the periphery of the catalyst carrier becomes easy. Additionally, in the configuration where the middle member is divided, if an outside load acting on the middle member from the outside elastic member is made greater than an inside load acting on the catalyst carrier from the inside elastic member, a compression load from outside to inside comes to act on the middle member, so the interstices between the divided portions of the middle member can be reduced more. For example, in the configuration where the middle member has an electrical insulating property, the insulating property can be improved by reducing these interstices.

Advantageous Effects of the Invention

The present invention is given the above-described configuration, so it can suppress a drop in the effect of heating a catalyst carrier caused by water droplets produced in an exhaust pipe.

BEST MODES FOR CARRYING OUT THE INVENTION

Figure 1:
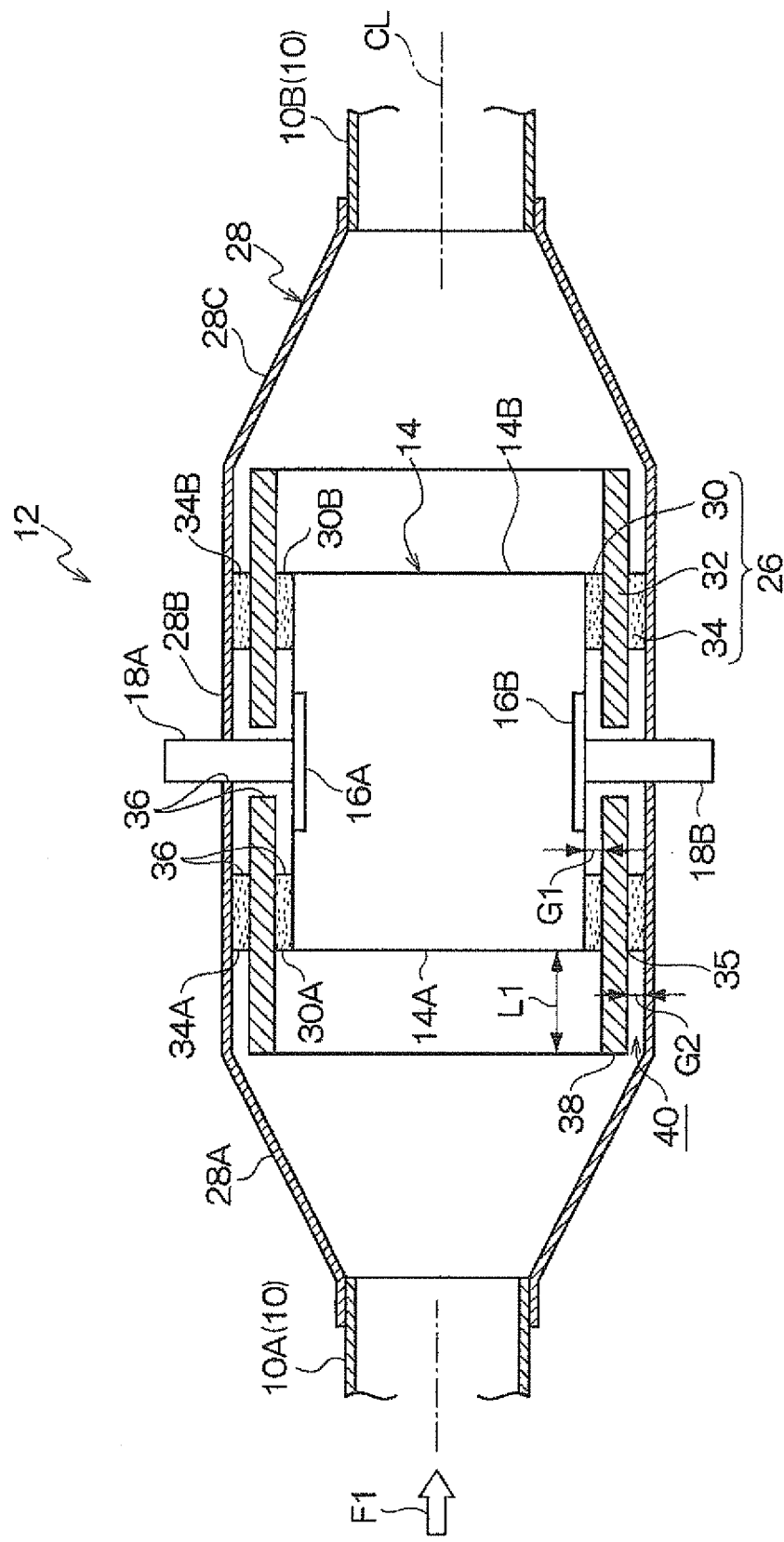
FIG. 1 is a sectional view showing, in a section including a centerline, a catalytic converter device of a first embodiment of the present invention in a state where it is attached to an exhaust pipe.

In FIG. 1, a catalytic converter device 12 of a first embodiment of the present invention is shown in a state where it is attached to an exhaust pipe 10.

As shown in FIG. 1, the catalytic converter device 12 has a catalyst carrier 14 that is formed by a material having electrical conductivity and rigidity. As the material configuring the catalyst carrier 14, electrically conductive ceramics, electrically conductive resins, and metals are applicable, but in the present embodiment, an electrically conductive ceramic in particular is used.

The catalyst carrier 14 is formed in a circular column shape or a circular cylinder shape in which the surface area of the material is increased by configuring a honeycombed or corrugated thin-sheet into a spiral shape or a concentric circle shape, and a catalyst (platinum, palladium, rhodium, etc.) is carried on, in a state where it is adhered to, its surface.

The catalyst has the action of purifying substances (HC, etc.) in exhaust gas (whose flow direction is indicated by arrow F1) flowing through the exhaust pipe 10. The structure by which the surface area of the catalyst carrier 14 is increased is not limited to being honeycombed or corrugated described above.

Two electrodes 16A and 16B are stuck to the catalyst carrier 14, and terminals 18A and 18B are connected to the electrodes 16A and 16B, respectively. The catalyst carrier 14 can be heated by passing an electric current from the terminals 18A and 183 through the electrodes 16A and 16B to the catalyst carrier 14. Because of this heating, the temperature of the catalyst carried on the surface can be raised so that the purifying action of the catalyst can be highly exhibited.

The catalyst carrier 14 is held, in a state where it is contained inside a case cylinder 28 (a cylinder pertaining to the present invention), by a holding mat 26 (a holding member pertaining to the present invention) placed on its outer periphery.

The case cylinder 28 is formed in a substantially circular cylinder shape by a metal such as stainless steel, has on its flow direction upstream side an upstream-side tapered portion 28A whose diameter gradually increases downstream, has in its flow direction middle portion a large diameter portion 28B that continues from the upstream-side tapered portion 28A and has a larger diameter than the exhaust pipe 10, and has on its lengthwise direction downstream side a downstream-side tapered portion 28C that continues from the large diameter portion 28B and whose diameter gradually decreases downstream.

The downstream-side end portion of a front-side pipe 10A of the exhaust pipe 10 is connected to the upstream-side end portion of the upstream-side tapered portion 28A, the upstream-side end portion of a rear-side pipe 10B of the exhaust pipe 10 is connected to the downstream-side end portion of the downstream-side tapered portion 28C, and the sectional area of the flow path of the exhaust gas becomes locally enlarged at the portion of this case cylinder 28 (particularly the large diameter portion 28B).

The holding mat 26 placed on the outer periphery of the catalyst carrier 14 is formed in a substantially circular cylinder shape given a three-layer structure comprising an inside fiber layer 30, a solid layer 32, and an outside fiber layer 34 in order from the inside. Moreover, the large diameter portion 28B of the case cylinder 28 is placed on the outer periphery of the holding mat 26. The inside fiber layer 30 corresponds to an inside elastic member of the present invention, the solid layer 32 corresponds to a middle member of the present invention, and the outside fiber layer 34 corresponds to an outside elastic member of the present invention.

The inner peripheral surface of the inside fiber layer 30 contacts the outer peripheral surface of the catalyst carrier 14, and the outer peripheral surface of the outside fiber layer 34 contacts the inner peripheral surface of the case cylinder 28. The inside fiber layer 30 and the outside fiber layer 34 are formed in a fibrous form having an insulating property and a predetermined elasticity by an alumina mat, a resin mat, or ceramic wool, for example. Thus, the holding mat 26 itself also comes to have a predetermined elasticity, and the holding mat 26 holds the catalyst carrier 14 inside the case cylinder 28 with the substantially circular cylinder shape such that these become concentric (about a centerline CL).

In contrast, the solid layer 32 is, in the present embodiment, configured by a solid material such as a metal, for example. That is, the inside fiber layer 30 and the outside fiber layer 34 that have an insulating property and elasticity are placed on the inner peripheral side and the outer peripheral side of the solid layer 32 that has shape stability because of the solid material, and the catalyst carrier 14 is stably held inside the case cylinder 28.

In particular, because the linear coefficients of expansion of the case cylinder 28 that is made of a metal and the catalyst carrier 14 that is made of an electrically conductive ceramic differ, the expansion amounts of the case cylinder 28 and the catalyst carrier 14 caused by the heat of the exhaust gas passing through the exhaust pipe 10 and the electrical heating of the catalyst carrier 14 differ. The difference in the expansion amounts is absorbed by the elasticity of the holding mat 26. Moreover, also with respect to input of vibration through the exhaust pipe 10, the holding mat 26 absorbs positional displacement between the case cylinder 28 and the catalyst carrier 14 while exhibiting a buffering action.

Also, because the holding mat 26 that has an insulating property is placed between the catalyst carrier 14 and the case cylinder 28, the flow of electricity from the catalyst carrier 14 to the case cylinder 28 becomes blocked. As the material configuring the inside fiber layer 30 and the outside fiber layer 34, Interam mat or mullite are also applicable.

The inside fiber layer 30 causes a predetermined holding load HF1 to act with respect to the catalyst carrier 14 and holds the catalyst carrier 14 by a reaction force compressed in the radial direction. Further, the outside fiber layer 34 causes a predetermined holding load HF2 to act with respect to the solid layer 32 and holds the solid layer 32 by a reaction force compressed in the radial direction. The holding loads HF1 and HF2 will be described later.

Through holes 36 through which the terminals 18A and 18B are passed are formed in the large diameter portion 28B of the case cylinder 28, the outside fiber layer 34, the solid layer 32, and the inside fiber layer 30, and the terminals 18A and 18B do not contact.

In the present embodiment, as will be understood from FIG. 1, an upstream-side end face 30A of the inside fiber layer 30 and an upstream-side end face 34A of the outside fiber layer 34 are both set in the same position in the flow direction as an upstream-side end face 14A of the catalyst carrier 14. In contrast, a projecting portion 38 that projects toward the upstream side of the upstream-side end face 14A of the catalyst carrier 14 is formed projecting from the solid layer 32. By forming this projecting portion 38, an interstice portion 40 is configured between the projecting portion 38 and the case cylinder 28. Particularly in the present embodiment, the projecting portion 38 is formed across the entire circumference in the circumferential direction so as to follow the inner peripheral surface of the large diameter portion 26B of the case cylinder 28. Consequently, the interstice portion 40 is also configured on the entire circumference in the circumferential direction of the catalyst carrier 14. To form the interstice portion 40, in terms of the relative positional relationship between the projecting portion 38 and the outside fiber layer 34, it suffices as long as the projecting portion 38 projects toward the upstream side of the outside fiber layer 34, and the position of the inside fiber layer 30 (particularly the position of its upstream-side end face) is not limited. Further, particularly in the present embodiment, as shown also in FIG. 3, the projecting portion 38 is formed across the entire circumference in the circumferential direction on an upstream-side end face 32A of the solid layer 32.

In the present embodiment, a downstream-side end face 30B of the inside fiber layer 30 and a downstream-side end face 34B of the outside fiber layer 34 are both set to the same position in the flow direction as a downstream-side end face 14B of the catalyst carrier 14, and the solid layer 32 projects toward the downstream side from the downstream-side end face 14B of the catalyst carrier 14. Consequently, the catalytic converter device 12 has a substantially symmetrical shape at its front and rear in the flow direction.

Next, the action of the catalytic converter device 12 of the present embodiment will be described.

As shown in FIG. 1, the case cylinder 28 of the catalytic converter device 12 is attached to the midsection of the exhaust pipe 10 (between the front-side pipe 10A and the rear-side pipe 10B) so as to become concentric with the exhaust pipe 10, and the exhaust gas passes through the inside of the catalyst carrier 14. At this time, substances (HC, etc.) in the exhaust gas are purified by the catalyst carried on the catalyst carrier 14.

In the catalytic converter device 12 of the present embodiment, the catalyst carrier 14 is heated by passing an electric current through the catalyst carrier 14 by the terminals 18A and 18B and the electrodes 16A and 16B, whereby the temperature of catalyst carried on the catalyst carrier 14 is raised so that the purifying action can be more highly exhibited. For example, in a case where the temperature of the exhaust gas is low, such as immediately after startup of the engine, the purifying performance of the catalyst during the early stage of engine startup can be ensured by performing electrical heating of the catalyst carrier 14 beforehand.

Water is included in the exhaust gas, so on the upstream side of the catalytic converter device 12, the water in the exhaust pipe 10 condenses into water droplets. Additionally, sometimes the water droplets adhere to the inner peripheral surface of the case cylinder 28 because they are scattered toward the downstream side by the flow of the exhaust gas.

Here, there will be assumed a catalytic converter device (a comparative example) where the projecting portion 38 of the present embodiment is not formed and where all of the upstream-side end faces of the inside fiber layer 30, the solid layer 32, and the outside fiber layer 34 are in the same position in the flow direction as the upstream-side end face 34A of the catalyst carrier 14. In this catalytic converter device, in a case where the water droplets adhere so as to span the catalyst carrier 14 and the case cylinder 28, there is the fear that these will end up being short-circuited. Because of this short-circuit, some of the electricity normally flowing through the catalyst carrier 14 flows through the case cylinder 28, so the amount of the electric current passing through the catalyst carrier 14 ends up decreasing.

In contrast, in the catalytic converter device 12 of the present embodiment, the projecting portion 38 that projects toward the upstream side of the outside fiber layer 34 is formed on the solid layer 32 of the holding mat 26, and the interstice portion 40 is configured between the projecting portion 38 and the case cylinder 28. Consequently, even if the water droplets adhering to the inner peripheral surface of the case cylinder 28 grow in the interstice portion 40, they do not reach the catalyst carrier 14 because the projecting portion 38 serves as a barrier. That is, compared to the catalytic converter device of the comparative example described above, the water droplets no longer contact both the inner peripheral surface of the case cylinder 28 and the catalyst carrier 14, so short-circuits caused by water droplets between the catalyst carrier 14 and the case cylinder 28 can be suppressed.

Figure 3:
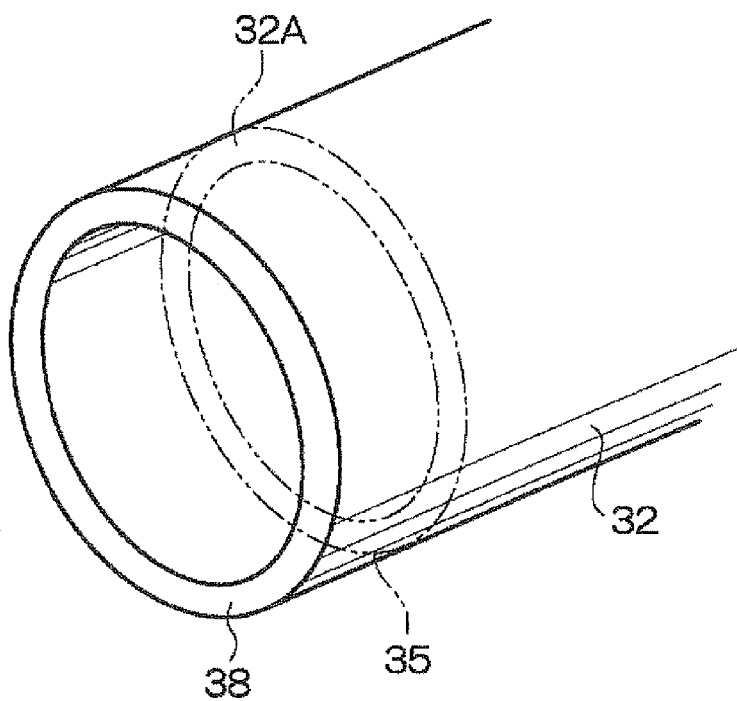
FIG. 3 is a perspective view showing one example of a solid layer configuring the catalytic converter device of the present invention.
Figure 4:
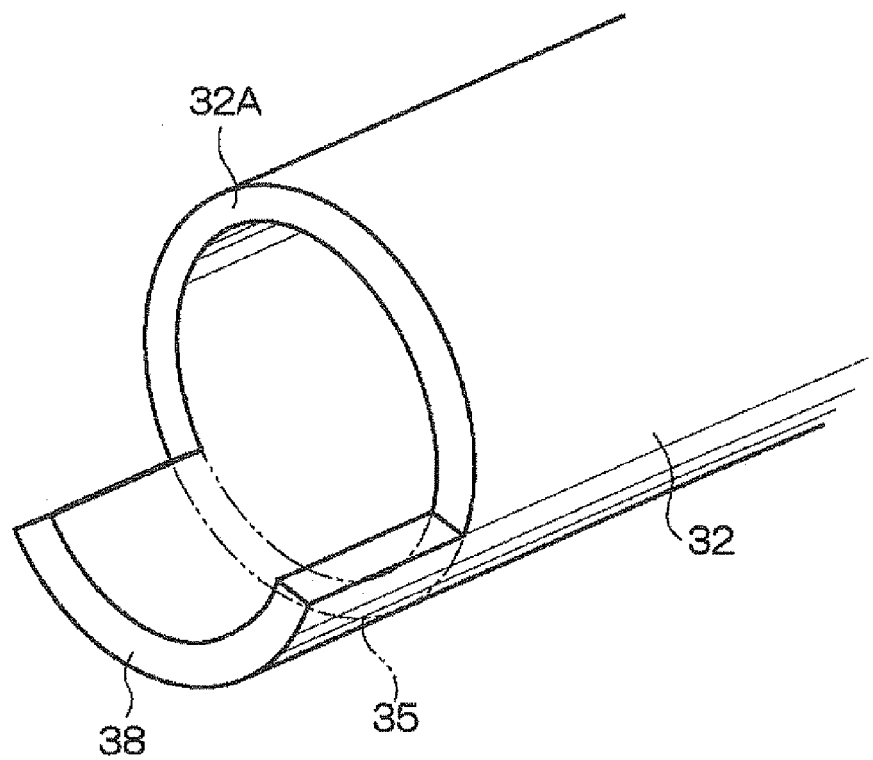
FIG. 4 is a perspective view showing one example differing from the one shown in FIG. 3 of the solid layer configuring the catalytic converter device of the present invention.

In the above-described embodiment, as example is given where the projecting portion 38 is formed on the entire circumference as shown also in FIG. 3 when seen in the direction along the centerline CL, but in actuality, water droplets produced by condensation of water on the upstream side of the catalytic converter device 12 move toward the downstream side while falling because of gravity. Consequently, it is preferable to form the projecting portion 39 on a site including at least a lowermost end portion 35 in the circumferential direction of the solid layer 32 as shown also in FIG. 4. For example, even in a configuration where the projecting portion 38 is formed to an extent of half the circumference on the lower side of the solid layer 32 or to an extent shorter than half the circumference, it becomes possible to suppress short-circuits caused by water droplets between the catalyst carrier 14 and the case cylinder 28. When the projecting portion 38 is formed across the entire circumference, short-circuits between the catalyst carrier 14 and the case cylinder 28 caused by water droplets can be suppressed across the entire circumference. As shown in FIG. 3, also in the example where the projecting portion 38 is formed across the entire circumference, the projecting portion 38 becomes formed on the site including at least the lowermost end portion 35.

A length (projecting length) L1 of the projecting portion 38 in the axial direction (the flow direction of the exhaust gas) and an interval G2 in the radial direction between the case cylinder 28 and the solid layer 32 (the projecting portion 38) are decided by the assumed amount of water droplets adhering to the inner peripheral surface of the case cylinder 28.

However, if the projecting length L1 and the interval G2 are made too long, this leads to an excessive increase in the size of the catalytic converter device 12. Consequently, it suffices for the projecting length L1 to be about 50 mm and for the interval G2 to be about 13 mm. This interval necessarily coincides with the thickness of the outside fiber layer 34 in a state where the catalyst carrier 14 is held in the case cylinder 28.

Moreover, in the present embodiment, a configuration where the solid layer 32 also projects toward the downstream side of the downstream-side end face 14B of the catalyst carrier 14 is given, but from the standpoint of miniaturizing the catalytic converter device 12, it is not necessary for the solid layer 32 to project toward the downstream side.

Figure 2:
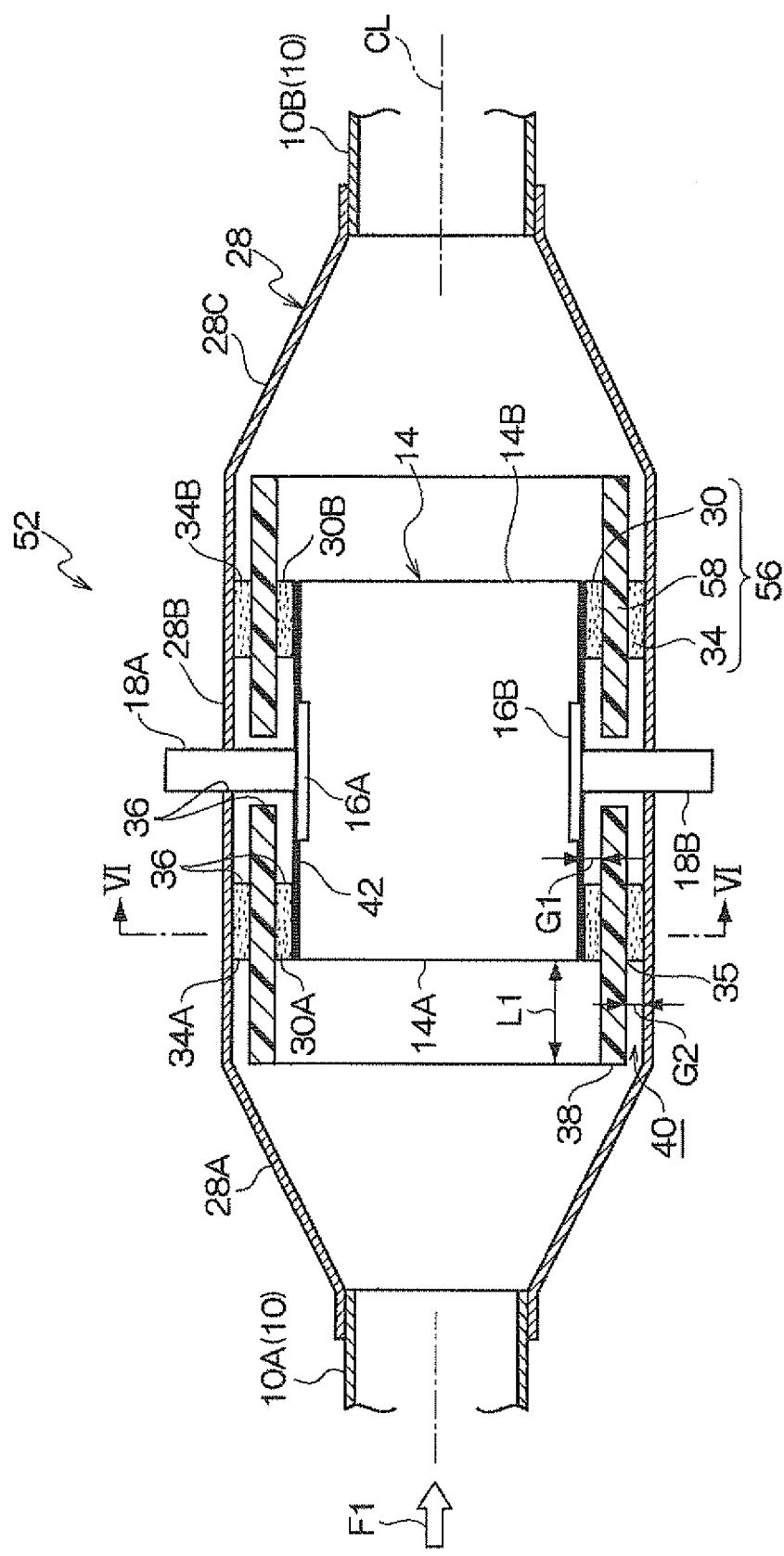
FIG. 2 is a sectional view showing, in a section including a centerline, a catalytic converter device of a second embodiment of the present invention in a state where it is attached to the exhaust pipe.

In FIG. 2, there is shown a catalytic converter device 52 of a second embodiment of the present invention. Further, in FIG. 6, the catalytic converter device 52 is shown in a sectional view along line VI-VI of FIG. 2. In the second embodiment, regarding components and members that are identical to those in the first embodiment, identical reference signs will be given thereto and detailed description thereof will be omitted.

The catalytic converter device 52 of the second embodiment differs from the first embodiment in that a solid layer (middle member) configuring a holding mat 56 is configured particularly by an insulating material and in that the catalytic converter device 52 has an insulating coating layer 42 (below, particularly the middle member in the second embodiment will be called an insulating solid layer 58 to distinguish it from the solid layer 32 in the first embodiment).

That is, as for the insulating solid layer 58, the projecting portion 38 is formed projecting toward the upstream side from the upstream-side end face 14A of the catalyst carrier 14, and the interstice portion 40 is configured between the projecting portion 38 and the case cylinder 28. Further, in the catalytic converter device 52 of the second embodiment, the insulating coating layer 42, which is configured by a glass coating or the like, is applied to the outer peripheral portion of the catalyst carrier 14 (at least the portion where the catalyst carrier 14 opposes the inside fiber layer 30). The insulating coating layer 42 is one example of an insulating layer pertaining to the present invention, and the catalyst carrier 14 and the inside fiber layer 30 (the holding mat 26) are electrically insulated as a result of this insulating coating layer 42 being placed between the catalyst carrier 14 and the inside fiber layer 30. Components and members other than this are given configurations identical to those of the catalytic converter device 12 of the first embodiment, so detailed description thereof will be omitted.

As the insulating solid layer 58 of the second embodiment, a solid material having an insulating property such as a ceramic or a mica sheet, for example, can be used. Further, in the second embodiment, because the insulating property of the holding mat 56 is ensured by the insulating solid layer 58, it is not invariably necessary for the inside fiber layer 30 and the outside fiber layer 34 to be configured by a material having an insulating property.

The catalytic converter device 52 of the second embodiment which is given this configuration also provides the same action and effects as those of the catalytic converter device 12 of the first embodiment.

Incidentally, in the catalytic converter device 52 of the present embodiment, because the inside fiber layer 30 and the outside fiber layer 34 are formed in a fibrous shape as described above, sometimes they absorb water. Consequently, even if they have an insulating property in a normal state (a state where they have not absorbed any water), sometimes the insulating property of the inside fiber layer 30 and the outside fiber layer 34 drops because of water absorption.

However, in the catalytic converter device 52 of the second embodiment, a drop in the insulating property of the holding mat 56 can be suppressed even in a case where the inside fiber layer 30 and the outside fiber layer 34 have absorbed water. That is, even if a drop in the insulating property caused by water absorption of the inside fiber layer 30 and the outside fiber layer 34 arises, in the catalytic converter device 52 of the second embodiment, an electrical short-circuit between the catalyst carrier 14 and the case cylinder 28 via the holding mat 56 can be blocked and a drop in the efficiency of heating by passing an electric current through the catalyst carrier 14 can be suppressed because the insulating solid layer 58 is placed between the inside fiber layer 30 and the outside fiber layer 34.

In addition, in the catalytic converter device 52 of the present embodiment, the insulating coating layer 42, which is configured by a glass coating or the like, is formed on the portion of the catalyst carrier 14 opposing the inside fiber layer 30. Consequently, in a case where the inside fiber layer 30 and the outside fiber layer 34 have absorbed water in this way and their insulating property has dropped, leakage of the electric current from the catalyst carrier 14 to the holding mat 26 can be suppressed and a drop in the efficiency of heating by passing an electric current through the catalyst carrier 14 can be suppressed by the insulating coating layer 42.

As described above, from the standpoint of suppressing leakage of the electric current from the catalyst carrier 14 to the case cylinder 28 in a case where the inside fiber layer 30 and the outside fiber layer 34 have absorbed water, the configuration may be equipped with at least one of the insulating solid layer 58 and the insulating coating layer 42. That is, it suffices for at least one layer of an insulating member to be placed between the catalyst carrier 14 and the case cylinder 28. In a configuration where an insulating property is imparted to the middle member, it becomes possible to lower the manufacturing cost of the catalytic converter device because it is not necessary to form the insulating coating layer 42. In contrast, in a configuration where the insulating coating layer 42 is formed, a more reliable electric current leakage suppressing effect is obtained because the member having the insulating property becomes positioned further inward than the inside fiber layer 30.

Figure 5:
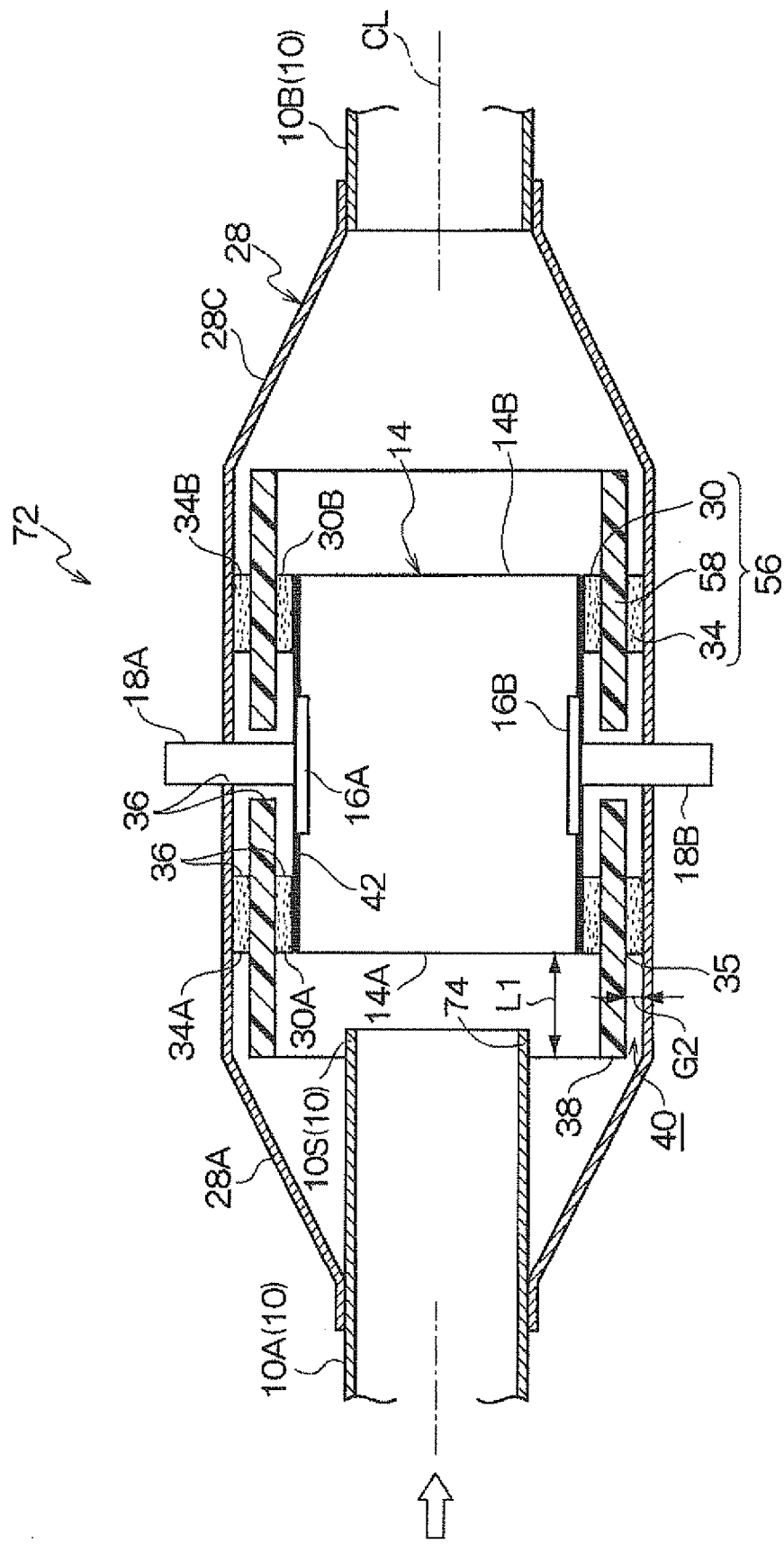
FIG. 5 is a sectional view showing, in a section including a centerline, a catalytic converter device of a third embodiment of the present invention in a state where it is attached to the exhaust pipe.

In FIG. 5, there is shown a catalytic converter device 72 of a third embodiment of the present invention. The third embodiment is given a configuration that is substantially identical to that of the catalytic converter device 52 of the second embodiment but differs from the second embodiment in that the downstream-side end portion of the front-side pipe 10A configuring the exhaust pipe 10 extends toward the downstream side to configure an extension portion 10S and reaches the neighborhood of the catalyst carrier 14. The length to which this front-side pipe 10A extends is not particularly limited, but in the example shown in FIG. 5, the front-side pipe 10A extends to an extent that it has an overlapping section 74 that overlaps the projecting portion 38 when seen from the radial direction of the case cylinder 28.

The catalytic converter device 72 of the third embodiment which is given this configuration provides the same action and effects as the catalytic converter device 52 of the second embodiment, and it also becomes possible to raise the effect of purifying substances (HC, etc.) in the exhaust gas.

That is, in the catalytic converter device 72 of the third embodiment, compared to the catalytic converter device 52 of the second embodiment, the exhaust gas becomes guided to the neighborhood of the catalyst carrier 14 by the extension portion 10S. Consequently, the raising of the temperature of the catalyst carrier 14 by the exhaust gas is promoted, so it becomes possible to raise the effect of purifying substances (HC, etc.) in the exhaust gas.

Figure 6:
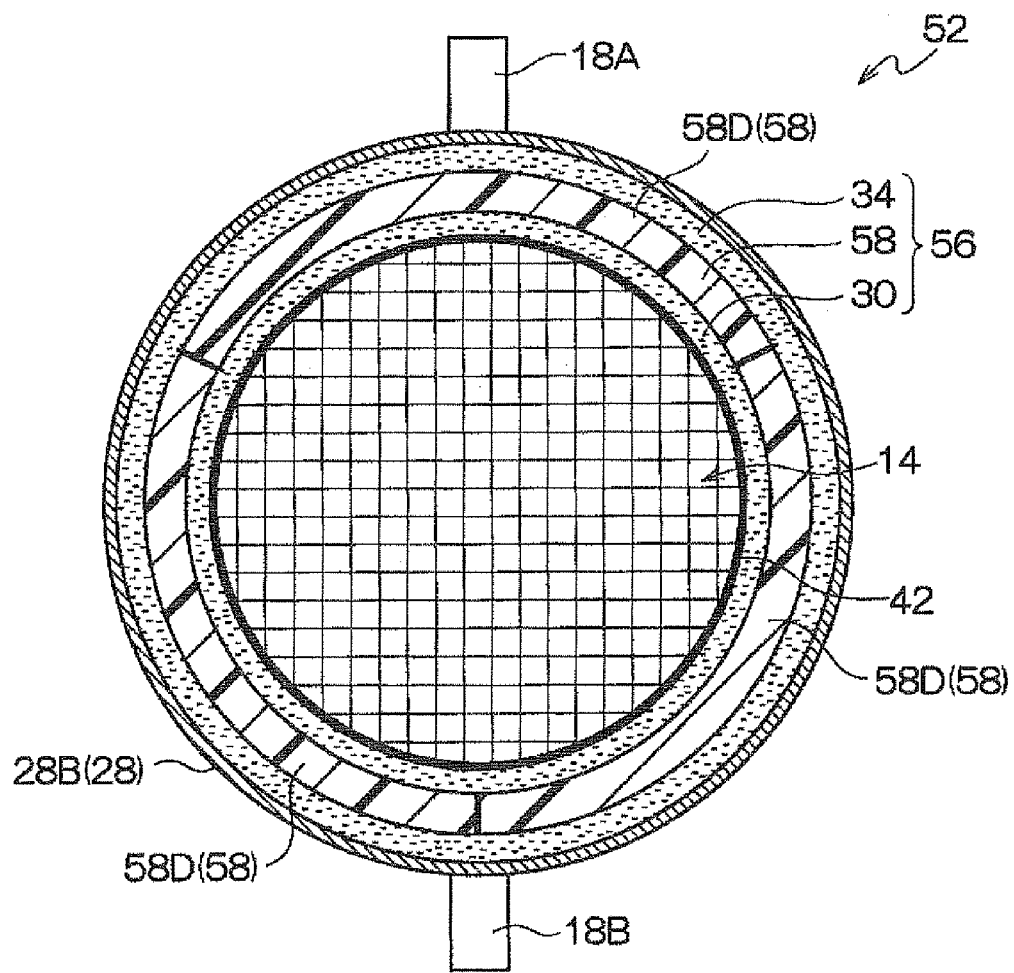
FIG. 6 is a sectional view along line VI-VI of FIG. 2 showing the catalytic converter device of the second embodiment of the present invention.

In each of the above-described embodiments, the structure and shape in the circumferential direction of the solid layer 32 (below, including the insulating solid layer 58) are not particularly limited, and the solid layer may be formed integrally in the circumferential direction. Here, in FIG. 6, as one example, the catalytic converter device 52 of the second embodiment of the present invention is shown in a sectional view along line VI-VI of FIG. 2. As shown in FIG. 6, the insulating solid layer 58 may be configured by divided solid layers 58D that have been divided into a plurality (three in the example in FIG. 6) in the circumferential direction. In FIG. 6, the catalytic converter device 52 of the second embodiment is given as an example, so the solid layer 58 configured by divided solid layers 58, but if the catalytic converter device is the catalytic converter device 12 of the first embodiment, the solid layer 32 is configured by divided solid layers that have been divided in the same way as the divided solid layers 58D.

In particular, as the method of manufacturing the catalytic converter device, in a case where a method in which the electrodes 16A and 16B and the terminals 18A and 18B are attached before placing the holding mat 26 and the case cylinder 28 around the periphery of the catalyst carrier 14 is applied, there arises the need to pass the upper and lower terminals 18A and 18B through the solid layer 32. Consequently, when the solid layer 32 is divided into at least two in the circumferential direction, the terminals 18A and 18B can be passed through the solid layer 32 and attached so as to surround the periphery of the catalyst carrier 14, and manufacture of the catalytic converter device becomes easy.

Additionally, in the present invention, because the solid layer 32 is configured by plural divided solid layers in the circumferential direction in this way, the holding load HF2 of the outside fiber layer 34 is set higher with respect to the holding load HF1 of the inside fiber layer 30 (that is, holding load HF1<holding load HF2).

Here, the holding load HF1 of the inside fiber layer 30 is a load (the product of the contact area and the load per unit area (contact pressure)) acting on the catalyst carrier 14 from the inside fiber layer 30 in a case where the inside fiber layer 30 that has been compressed in the radial direction is causing a load to act inward in the radial direction on and is holding the catalyst carrier 14. This holding load HF1 is set with its upper limit being of an extent where, considering the strength of the catalyst carrier 14, it does not break the catalyst carrier 14.

Further, the holding load of the outside fiber layer 34 is a load (the product of the contact area and the load per unit area (contact pressure)) acting on the solid layer 32 from the outside fiber layer 34 in a case where the outside fiber layer 34 that has been compressed in the radial direction is causing a load to act inward in the radial direction on and is holding the solid layer 32. This holding load HF2 is set with its upper limit being of an extent where, considering the strength of the solid layer 32, it does not break the solid layer 32.

In this way, by setting the holding load HF2 larger than the holding load HF1, a compression load inward in the radial direction acts overall on the solid layer 32.

Figure 7A:
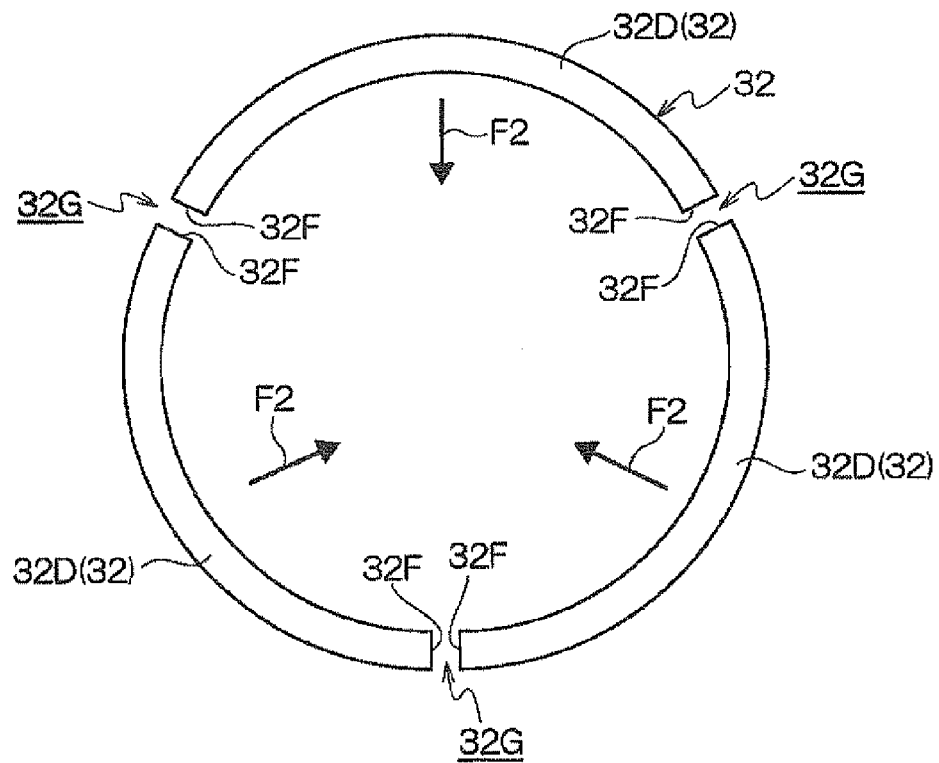
FIG. 7A is an explanatory diagram showing the relationship between loads acting on divided solid layers of the catalytic converter device and the positions of the divided solid layers in a state where there are interstices between the divided solid layers.

In FIG. 7A, as a reference, the solid layer 32 in a case where the holding load HF2 is equal to the holding load HF1 or is less than the holding load HF1 is schematically shown as an end face seen from the upstream side (or the downstream side).

As shown in FIG. 7A, at the boundary portions of the divided solid layers 32D, sometimes slight gaps 32G in the circumferential direction arise between joint portions 32F due to forming circumstances and the like. Further, even in a case where the gaps 32G do not arise, sometimes the degree of close contact between the joined portions 32F becomes low. Particularly in the ease of the configuration (second embodiment) using the insulating solid layer 58 as the solid layer (middle member), sometimes the insulating property drops because of the gaps 32G.

Figure 7B:
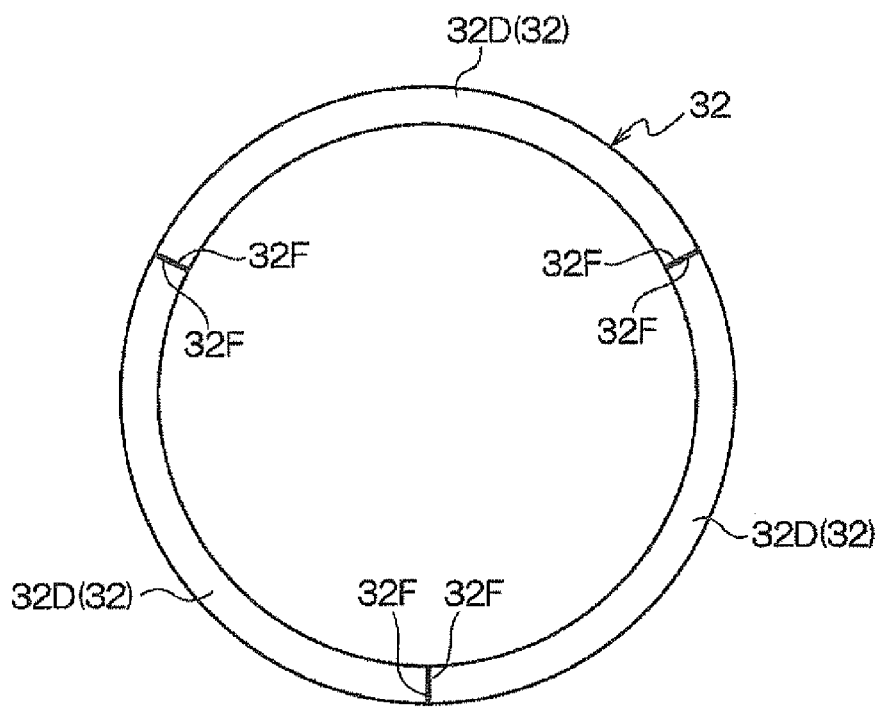
FIG. 7B is an explanatory diagram showing the relationship between loads acting on the divided solid layers of the catalytic converter device and the positions of the divided solid layers in a state where the divided solid layers are in close contact with each other.

In contrast, when the holding load HF2 is set larger than the holding load HF1 and, as indicated by arrows F2 in FIG. 7A, a compression load inward in the radial direction is caused to act on the solid layer 32, the joint portions 32F of the divided solid layers 32D move in the direction in which they come into close contact with each other, and the interstices can be eliminated as shown in FIG. 7B (in a case where they are already in close contact with each other, the closeness becomes higher). Particularly in the case of the configuration using the insulating solid layer 58 as the solid layer 32, a drop in the insulating property caused by the gaps 32G arising (or the closeness of the joint portions 32F being low) can be suppressed.

In this way, the specific configuration for making the holding load HF2 greater than the holding load HF1 is not particularly limited; for example, in a ease where the surface densities of the inside fiber layer 30 and the outside fiber layer 34 in the state before attachment to the periphery of the catalyst carrier 14 (a natural state where they are not elastically compressed) are equal, by compressing the outside fiber layer 34 more in the radial direction than the inside fiber layer 30, the elastic reaction force of the outside fiber layer 34 becomes greater than the elastic reaction force of the inside fiber layer 30 and the holding load HF2 becomes greater than the holding load HF1.

Consequently, by ensuring that the interval G2 (see FIG. 1 and FIG. 2) in the radial direction between the solid layer 32 and the case cylinder 28 becomes smaller than an interval G1 (see FIG. 1 and FIG. 2) in the radial direction between the catalyst carrier 14 and the solid layer 32 in a state where the catalyst carrier 14 is held in the case cylinder 28 by the holding mat 26 (a state where the joint portions 32F are in close contact with each other), the holding load HF2 becomes greater than the holding load HF1. For example, it suffices for the interval G1 to be set to 5 mm and for the interval G2 to be set to 3 mm.

Further, if the structure is a structure where the above-described intervals G1 and G2 are equal, the holding load HF2 can be made greater than the holding load HF1 by making the surface density of the outside fiber layer 34 greater than the surface density of the inside fiber layer 30. For example, it suffices to set the surface density of the inside fiber layer 30 to 1300 g/m² and to set the surface density of the outside fiber layer 34 to 1700 g/m². Further, even when a material whose repulsion force is greater than that of the inside fiber layer 30 is used as the outside fiber layer 34, it is possible to make the holding load HF2 greater than the holding load HF1.

In both configurations, the load substantially acting on the catalyst carrier 14 becomes the difference between the holding load HF2 and the holding load HF1. Consequently, for example, compared to a structure where only the holding load HF2 acts, the load acting on the catalyst carrier 14 becomes small. For this reason, the potential for the catalyst carrier 14 to be broken drops even in a case where the strength of the catalyst carrier 14 is low. In a case where SiC is used as the material of the catalyst carrier 14, particularly in the catalyst body of the present embodiments, the percentage of air holes is high because of the purpose of raising electrical resistance, for example, and the catalyst carrier 14 is lightweight as compared to SiC used in a DPF (Diesel particulate filter: a filter corresponding to exhaust gas of a diesel engine), for example, and it is possible to hold the catalyst carrier 14 with a smaller load.

The number of the divided solid layers 32D—that is, the number of divisions in the circumferential direction of the solid layer 32 is also not particularly limited, but when the number of divisions is increased, the shapes of the divided solid layers 32D become close to planar, and the stress acting on the divided solid layers 32D decreases. Thus, by making the divided solid layers 32D thin-walled, it becomes possible to make the solid layer 32 lightweight, simplify the structure, and improve productivity.

Further, in the above description, examples where the catalytic converter devices 12 and 52 are placed horizontally have been shown in the drawings, but the catalytic converter device 12 may also be placed slanted in the vehicle front-rear direction.

The invention claimed is:

1. A catalytic converter device comprising:
a catalyst carrier that carries a catalyst for purifying exhaust gas exhausted from an internal combustion engine and is heated by passing an electric current therethrough;
a cylinder that is formed in a cylindrical shape, contains the catalyst carrier inside, and is attached to an exhaust pipe;
a holding member that is equipped with an inside elastic member placed on an outer peripheral surface side of the catalyst carrier, an outside elastic member placed on an inner peripheral surface side of the cylinder, and a middle member placed between the inside elastic member and the outside elastic member, with the holding member holding the catalyst carrier in the cylinder by the elasticity of the inside elastic member and the outside elastic member and electrically insulating the catalyst carrier and the cylinder;
a projecting portion that is disposed on at least part of an upstream-side end portion of the middle member in a flow direction of the exhaust gas and is positioned on the upstream side of an upstream-side end portion of the outside elastic member, and
an insulating coating layer that is placed between the catalyst carrier and the inside elastic member and electrically insulates the catalyst carrier and the inside elastic member.

2. The catalytic converter device according to claim 1, wherein the middle member has an electrical insulating property.

3. The catalytic converter device according to claim 1, wherein the projecting portion is disposed on a portion including a lowermost end portion of the upstream-side end portion of the middle member.

4. The catalytic converter device according to claim 3, wherein the projecting portion is formed on the entire circumference along the inner peripheral surface of the cylinder.

5. The catalytic converter device according to claim 1, wherein
the middle member is divided into a plurality in a circumferential direction of the catalyst carrier, and
an outside load acting on the middle member from the outside elastic member is made greater than an inside load acting on the catalyst carrier from the inside elastic member.

* * * * *